June 13, 1967  J. E. McKINSTRY  3,324,834
ANIMAL WATERER
Filed June 9, 1965

INVENTOR.
JAMES E. McKINSTRY
BY Marvin Moody
ATTORNEY

United States Patent Office 3,324,834
Patented June 13, 1967

3,324,834
ANIMAL WATERER
James E. McKinstry, Cedar Rapids, Iowa, assignor to Nelson Manufacturing Company, Cedar Rapids, Iowa, a corporation of Iowa
Filed June 9, 1965, Ser. No. 462,687
5 Claims. (Cl. 119—78)

This invention relates in general to waterers and, in particular, to an animal waterer which is easy to operate and keep clean.

It is necessary that livestock be watered at all times of the year and their rate of gaining weight and health is dependent upon a good water supply. The present invention provides an animal waterer that is operable all year in cold or warm climates and which cannot be broken or contaminated by the animals.

It is an object of this invention to provide an animal waterer which is easy to clean and maintain.

Another object is to provide an animal waterer which cannot be broken or contaminated by the animals which use it.

Yet another object is to provide a waterer with a self-operating valve which maintains the liquid level constant.

A feature of this invention is found in the provision for an animal waterer which has a cover pan, a float pan and a reservoir and in which movement of the float pan operates a supply valve located near the hinge point of the float pan to control the liquid level.

Further features, objects and advantages will become apparent from the following description and claims, when read in view of the drawings, in which;

Figure 1:
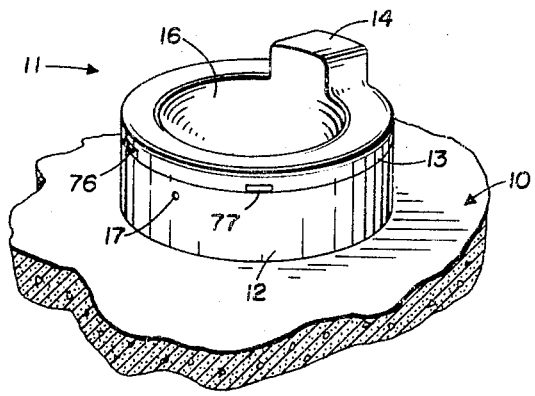
FIGURE 1 is a perspective view of the animal waterer of this invention.

FIGURE 1 illustrates the animal waterer 11 of this invention mounted in poured concrete 10. The waterer has a smooth bottom cylinder 12 and a smooth cover 13 formed with a drinking depression 16 and an extension 14. A latch release hole 17 is formed in the cylinder 12 and allows a hidden release to be loosened so that the cover 13 can be pivoted upwardly to clean the waterer. It is to be noted that the waterer is formed with no projections or catches in which an animal could stick a tooth or horn to upset the waterer. The latch release hole 17 is designed so that an animal cannot release the latch which fastens the cover 13 to bottom 12. The smooth outer surface does not give an animal a place to rub against for scratching and thus, the waterer is not likely to be damaged by the animal or the animal injured by the waterer. The operation of the waterer is quiet and the animal is not frightened by operation of the unit.

Figure 2:
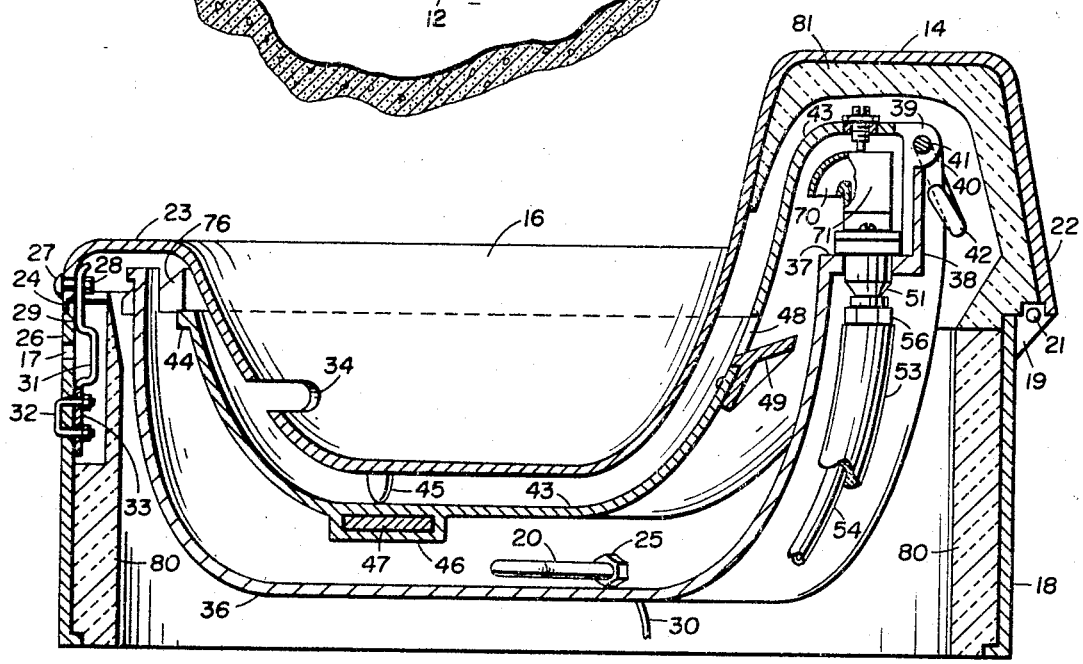
FIGURE 2 is a sectional view of the waterer.

FIGURE 2 illustrates the internal construction. The cylinder 18 is formed with a hinge 19 which supports cover pan 16 by a pivot pin 21. The surface 22 of projection 14 of cover pan 16 is flat so that when the cover pan 16 is pivoted upwardly, surface 22 rests against the surface of cylinder 18. A latch 31 locks cover pan 16 to cylinder 18 on the side opposite hinge 19. The lower end 33 of latch 31 is attached to cylinder 18 by holding means 32. The upper portion 29 of latch 31 is bifurcated and receives a nut 28 mounted on bolt 27 which is attached to cover pan 16. The lower edge 24 of pan 16 overlaps the upper edge 26 of cylinder 18 to form a smooth seal and provide structural support. Latch 31 is aligned with opening 17 so that the latch can be released from nut 28 by inserting a nail or other object through opening 17 to depress latch 31. This provides a latch which animals cannot release.

A slot 34 is formed in cover pan 16 to allow liquid to enter the drinking bowl.

A reservoir 36 is mounted in cylinder 18 and is supported therefrom by three L-shaped brackets 77 and an overflow bracket 76. The brackets 76 and 77 rest on the tops of cylinder 18 to support the reservoir 36. Notches are formed in cover 13 to receive the brackets. An electric heating element and thermostat 20 is attached by adapter 25 to reservoir 36. An electric cord 30 supplies electrical power to the element 20.

Figure 3:
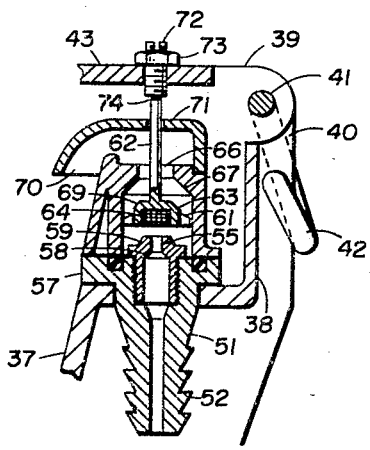
FIGURE 3 is an enlarged sectional view of the valve structure.

An upper portion 37 of reservoir 36 supports a valve structure which is best shown in FIGURE 3. A float pan 43 is pivotally supported from reservoir 36 by a pin 41 which has a handle 42 that locks on a ridge of the reservoir when in place. Hinges 39 are formed with openings through which pin 41 extends to pivotally attach float pan to reservoir 37. An upwardly extending projection 38 of reservoir 37 supports the hinges for this purpose.

A water supply line 54 is encased in an insulating hose 53 and supplies water to the waterer. A coupling 57 has a hose receiving portion 51 formed with notches 52 apon which hose 54 is received. A clamp 56 holds hose 54 on coupling. The flexible line 54 allows reservoir 36 to be lifted out of the cylinder to be dumped when cleaning the device.

A valve orifice 58 is threadedly mounted in coupling 57 and has a metering passage 55 adjacent its upper end.

The valve structure 71 is attached to coupling 57 and has a chamber in which a valve 63 is supported. The lower end of valve 63 has a pad 64 of resilient material mounted therein which bears on the upper end 59 of valve orifice 58 to close passage 55 when the valve is in the down position. A guide 61 centers the valve.

The valve stem 62 passes through an opening 66 formed in the valve structure and the upper edge 69 of the valve 63 seats in this opening to form a fluid seal when the float pan 43 is pivoted upwardly to allow the valve to move to the full up or open position.

A nozzle 70 is formed in the valve structure above opening 66. The valve stem 62 extends through an opening in the valve 71 and its upper end 74 engages a set screw 72 that is threaded to a nut 73 which is welded to float pan 43.

As best shown in FIGURE 2, float pan 43 is formed with a slot 48 below nozzle 70 and a baffle 49 is attached to the float pan to deflect fluid through slot 48 into the float pan. A weight holder 46 is formed in the bottom of float pan 43 and suitable ballast 47 is held in holder 46.

A stop 45 is attached to the lower surface of cover pan 16 to limit the upward movement of the float pan when the cover pan 16 is locked in the operating position.

Insulation material such as styrofoam is mounted in cylinder 18 and is designated as 80 and in cover pan 14 about valve 71 and is designated as 81. This prevents freezing of the valve and water during very cold weather. The heater 20 of course, supplies heat to the liquid to keep it from freezing.

In operation, water passes through orifice 55, by valve 63, out of opening 66 and through nozzle 70 until float pan 43 is filled. The water fills reservoir 36 and overflows over edge 44 into float bowl 43 or passes through slot 48 into float bowl 43. Baffle 49 deflects water from nozzle 70 through slot 48 to reduce turbulence. Water, of course, also passes through slot 34 to cover bowl 16 to be available for drinking. The float bowl 43 is formed of plastic or other material so that it is buoyant and will rise when not filled. The weight 47 allows the buoyancy to be adjusted to obtain the proper control of the waterer. When the float pan is unfilled it floats up and rests against the stop 45 and set screw 72 allows valve 63 to rise from orifice 59 against the water pressure. When the float pan has been filled, the weight of the water causes it to lose its buoyancy and to sink. This causes set screw 72 to push valve stem 62 downwardly which seats valve 63 on orifice 58 to turn off the water. The plastic pad 64 provides a fluid tight seal.

As animals drink the water, the level will fall below the top 44 of float bowl 43 and the bowl will become buoyant and will rise to engage stop 45. This allows set screw 72 to move upwardly and unseats valve 63 so that water can again enter the nozzle 70. The float pan 43 pivots about pin 41.

Occasionally it is desirable to clean the device and a stick or other object may be inserted through hole 17 to depress and release latch 31. The cover bowl 16 may then be swung up about pivot 21 which will dump the water and any accumulated deposits away from the waterer. The float pan 43 can be pivoted upwardly about pin 41 and handle 42 of pin 41 may be disengaged from reservoir extension 40 and removed. This allows the float pan to be removed for easy cleaning. When the float pan 43 is removed set screw 72 no longer engages valve stem 62 to hold the valve against orifice 58 and water pressure will cause valve 63 to rise until it seats against valve seat 67 adjacent opening 66. Shoulder 69 of the valve mates with valve seat 67 to provide a fluid seal. Thus, the water is turned off by the valve when the float bowl is moved even though set screw 72 does not engage valve stem 62. By adjusting set screw 72 the amount of water supplied to the device may be controlled. Generally, not more than $1/16$ inch movement of valve 63 is necessary during operation. Orifice 58 may be replaceable to allow more or less water into the device in a given time. Also a spring may be inserted in the valve structure to assist the float pan to hold the valve down with high pressure water supplies. Reservoir 36 may be removed and dumped due to the flexible hose 54.

After the device has been cleaned, the float pan may be again attached to the reservoir by pin 41 and cover pan 16 may be closed. This allows the waterer to once again fill for use.

Although this invention has been described with respect to a preferred embodiment, it is not to be so limited as changes and modifications may be made which are within the full intended scope as defined by the appended claims.

I claim:
1. An animal waterer comprising a cylinder mounted on a base plate, a cover member formed with a depression, and adapted to maintain a level of fluid, attached to the cylinder member, a float pan pivotally attached to the cylinder and mounted within the cylinder, a valve and discharge outlet means therefor attached to the cylinder, above the normal fluid level within said cover member adjacent the pivot point of the float pan and formed with an actuating means which the float pan engages, and an opening formed in the depression of the cover member to allow fluid to pass into the depression from the float pan.

2. In apparatus according to claim 1 a reservoir mounted within the cylinder and below the float pan and with its edges extending above the edges of the float pan and the valve formed with a nozzle which discharges into the space between the reservoir and the float pan.

3. In apparatus according to claim 2, an opening formed in the float pan below its upper rim adjacent the nozzle to supply fluid to the float pan.

4. In apparatus according to claim 3, a baffle mounted adjacent the opening in the float pan to direct fluid into the float pan.

5. In apparatus according to claim 1 wherein said valve comprises an inlet orifice and an outlet orifice, a valve means formed with a pair of valve seats engageable with the inlet or outlet orifices and the actuating means controlling the valve means so that it is seated or unseated in the inlet orifice in response to movement of the float pan.

References Cited
UNITED STATES PATENTS

| | | | |
|---|---|---|---|
| 1,779,746 | 10/1930 | Murdey | 119—74 |
| 2,162,314 | 6/1939 | Perri | 119—73 |
| 2,446,695 | 8/1948 | Didget | 119—74 |
| 2,452,305 | 10/1948 | Johnson | 119—81 |
| 2,628,631 | 2/1953 | Boyd | 119—80 X |
| 2,662,503 | 12/1953 | Johnson | 119—80 |
| 3,027,872 | 3/1962 | Nelson | 119—81 |

ALDRICH F. MEDBERY, *Primary Examiner.*
SAMUEL KOREN, *Examiner.*